United States Patent [19]

Akiyama et al.

[11] 4,334,709
[45] Jun. 15, 1982

[54] SEAT FOR VEHICLE

[75] Inventors: Yoshinori Akiyama; Shyichi Ueno, both of Yokohama, Japan

[73] Assignee: Nissan Motor Company, Ltd., Yokohama, Japan

[21] Appl. No.: 110,325

[22] Filed: Jan. 7, 1980

[30] Foreign Application Priority Data

Nov. 19, 1979 [JP] Japan ............................ 54-6315[U]

[51] Int. Cl.³ .............................................. A47C 7/02
[52] U.S. Cl. .................................... 297/284; 297/312; 297/458
[58] Field of Search ............... 297/312, 284, 429, 458, 297/201

[56] References Cited

U.S. PATENT DOCUMENTS

| 603,734 | 5/1898 | Peck et al. | 297/201 |
|---|---|---|---|
| 1,881,136 | 10/1932 | Schmidt | 297/201 |
| 3,446,532 | 5/1969 | Cramer | 297/312 |
| 3,550,953 | 12/1970 | Neale | 297/284 |
| 3,600,037 | 8/1971 | Lohr | 297/312 |
| 3,632,166 | 1/1972 | Lohr | 297/284 |
| 3,797,886 | 3/1974 | Griffiths | 297/458 |
| 3,883,173 | 5/1975 | Shephard | 297/312 |
| 3,989,297 | 11/1976 | Kerstholt | 297/312 |
| 4,018,477 | 4/1977 | Hogan | 297/284 |
| 4,153,294 | 5/1979 | Meiller et al. | 297/458 |

FOREIGN PATENT DOCUMENTS

| 1152027 | 7/1963 | Fed. Rep. of Germany . |
|---|---|---|
| 7340896 | 6/1975 | Fed. Rep. of Germany . |
| 327448 | 4/1930 | United Kingdom . |
| 353412 | 7/1931 | United Kingdom . |
| 562585 | 7/1944 | United Kingdom . |
| 584756 | 1/1947 | United Kingdom . |
| 1301595 | 12/1972 | United Kingdom . |
| 1307749 | 2/1973 | United Kingdom . |
| 1341769 | 12/1973 | United Kingdom . |
| 1346075 | 2/1974 | United Kingdom . |
| 2012573 | 1/1979 | United Kingdom . |

*Primary Examiner*—James T. McCall
*Attorney, Agent, or Firm*—Thompson, Birch, Gauthier & Samuels

[57] ABSTRACT

An adjustable seat for a vehicle having separated rear and front cushions. The front cushion is adapted to steplessly shift forward and backward with respect to the rear cushion at an inclination equal to that of the thigh of a seated man. Therefore, the seat supports the thigh of a seated man to increase his comfort.

5 Claims, 15 Drawing Figures

SEAT FOR VEHICLE

BACKGROUND OF THE INVENTION

1. Field of the Invention

This invention relates to an adjustable seat comprising separated cushions useful as a vehicle seat, and more particularly, to a vehicle seat structure having a front cushion and a rear cushion.

2. Description of the Prior Art

Most conventional vehicle seats capable of being adjusted in response to the figure and preference of a seated man do not satisfy the requirement for adjusting the depth of the seat, thus failing to provide adequate comfort.

For example, a vehicle seat having separated cushions; a rear cushion, and a front cushion which is capable of shifting forward and backward by stages, is not comfortable to sit in because, as FIG. 1 shows, the cross shifting of the front cushion (a), level with the rear cushion (b), allows an opening to be created between the front cushion (a) and the thigh (d) in a place indicated by the letter (e) so that the thigh (d) is not supported by the front cushion (a). In addition, the shortness of the length, indicated by the letter L, of the rear cushion (b) which includes a square frame (g) therein results in a narrowed distance between the edge (h) of the frame (g) and thigh (d) of the seated man (c). The narrowed distance leads to the stiff feeling of the pad of the rear cushion (b), the seat being uncomfortable to sit in. Also, the stepwise shift of the front cushion (a) does not allow fine adjustment thereof for optimum comfort. Letter (j) indicates a slide rail.

SUMMARY OF THE INVENTION

A primary object of this invention is to provide a comfortable seat for a vehicle which fits seated men of various sizes.

Another object of this invention is to provide a stepless adjustment by which a front cushion is shifted forward or backward.

In accordance with this invention a front cushion A, as FIG. 2 shows, shifts forward and backward at almost the same inclination as that of the thigh C of a seated man B, which keeps an opening from occurring at point E, the seat F fitting the seated man B. An enlarged frame H of a rear cushion G leaves a sufficient space between the edge Ha of the frame H and the thigh C of the seated man B, which provides comfort without the stiff feeling of the pad from the edge Ha. In addition, the front cushion A is steplessly shiftable so as to permit a delicate adjustment of the position thereof.

BRIEF DESCRIPTION OF THE ACCOMPANYING DRAWINGS

Figure 10:
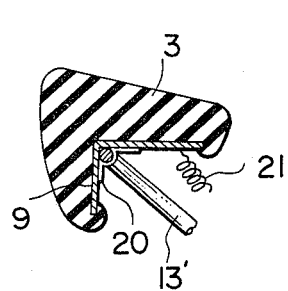
FIG. 10 is a schematic sectional view of the main part in another embodiment in accordance with the present invention.
Figure 11:
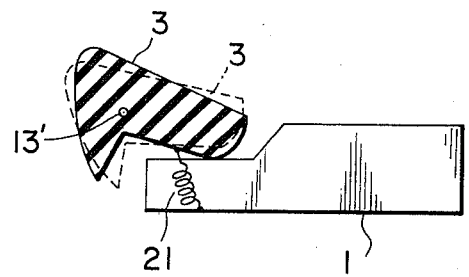
Figure 12:
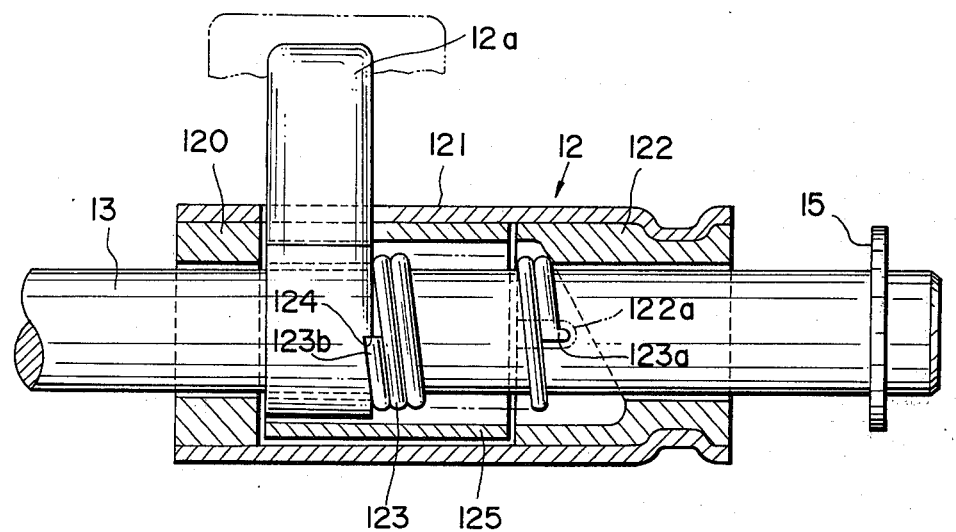
Figure 13:
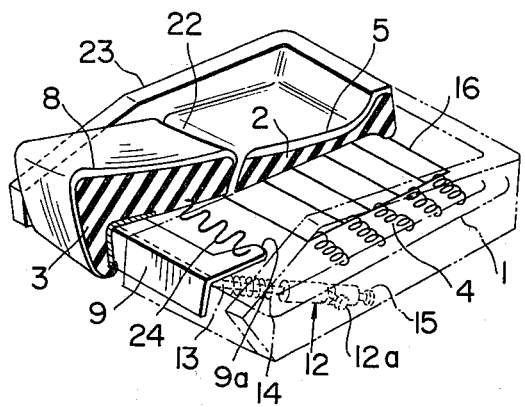
Figure 14:
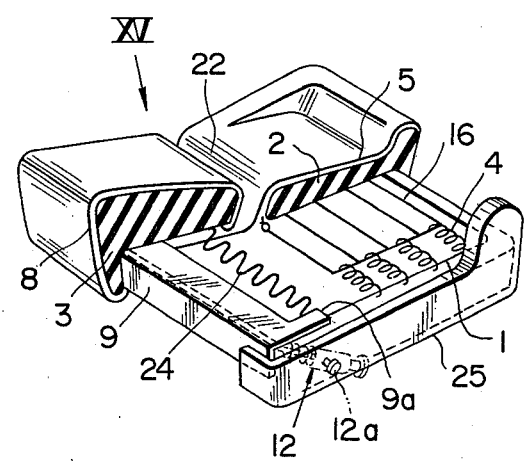
Figure 15:
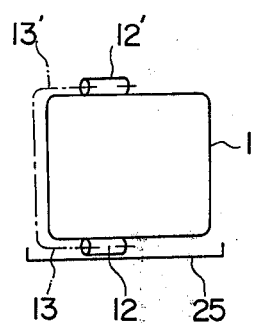

FIG. 11 schematically illustrates the connection between the cushion frame and the front pad shown in FIG. 10;

FIG. 12 is a sectional view of the cross-adjusting unit;

FIGS. 13 and 14 are schematic views illustrating two different embodiments of the present invention; and FIG. 15 is a schematic view in the direction of the arrow of FIG. 14.

DETAILED DESCRIPTION OF THE INVENTION

Figure 1:
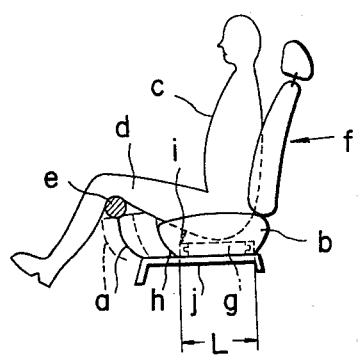
FIG. 1 illustrates the positional relationship between a conventional vehicle seat and a seated man.
Figure 2:
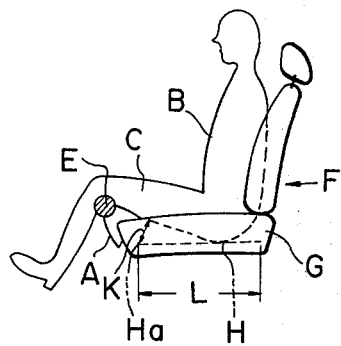
FIG. 2 illustrates the positional relationship between the vehicle seat of the present invention and a seated man.
Figure 3:
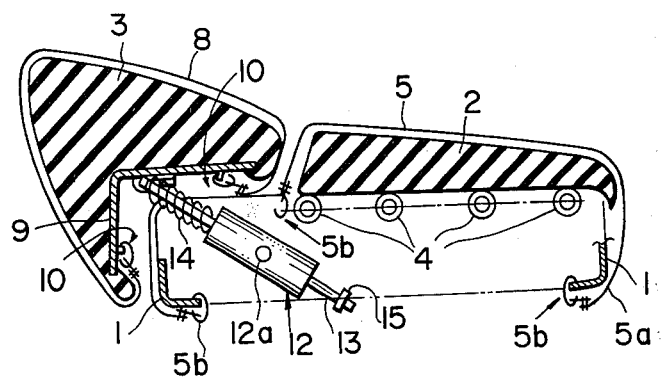
FIGS. 3 to 5 are cross sectional views of the seat in variously adjusted positions in accordance with the present invention.
Figure 4:
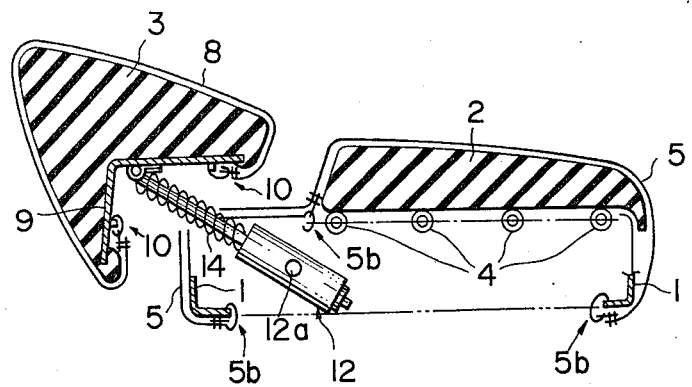
Figure 5:
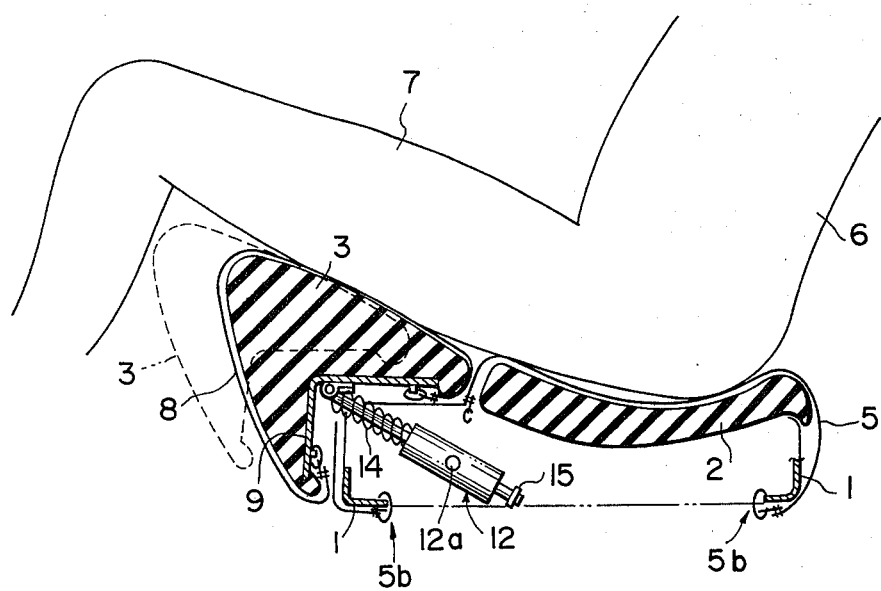
Figure 6:
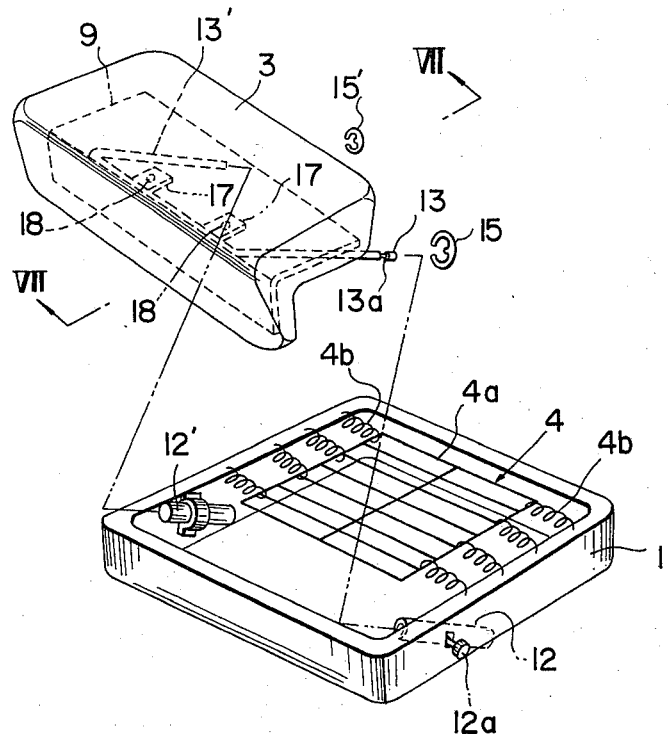
FIG. 6 is a perspective view illustrating the connection between a front pad, a cross-adjusting unit, and a cushion frame.

Referring now to FIGS. 3, 4, and 5, the cushion pad consists of two separated pads; the rear pad 2 as a seat cushion, to be more exact a rear seat cushion, and the front pad 3, of nearly triangular section, which supports the thigh of a seated man. The rear pad 2 is mounted on the springs 4 secured to a cushion frame 1 which is nearly square when viewed from above. A trim cover 5 is fastened at the ends 5a and in the middle with fastening elements 5b, covering both the rear pad 2 and the cushion frame 1. A trim cover 8 covers the front pad 3, both the ends thereof being fastened with fastening elements 10 to both the ends of a support bracket 9 of L-shaped section, respectively. As shown in FIG. 5, a pair of cross-adjusting units 12 and 12' are so fastened to the sides in the cushion frame 1 as to equal in inclination the thigh 7 of a seated man 6. As shown in FIG. 6, the support frame 13, 13' passing slidably through said cross-adjusting units 12 and 12' is linked in the middle with the support bracket 9, the front pad 3 moving forward and backward with the support frame 13, 13'. As shown in FIGS. 3, 4, and 5, a pushing compression spring 14 through which passes the support frame 13 is placed between the support bracket 9 and the cross-adjusting unit 12 to push the front pad 3 forward by the resiliency thereof. Referring back to FIG. 6, a stopper such as a ring, indicated by numeral 15, is fastened to a recess 13a adjacent to the end of the support frame 13 to set limits to the forward movement of the front pad 3. FIG. 6 indicates an operating knob 12a of the cross-adjusting unit 12. From FIG. 6 it is seen that the spring 4 comprises a lattice spring 4a and helical springs 4b linking said lattice spring 4a with the cushion frame 1.

Figure 7:
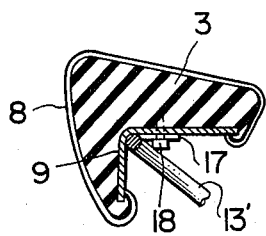
FIG. 7 is a schematic sectional view taken along line VII—VII in FIG. 6.
Figure 8:
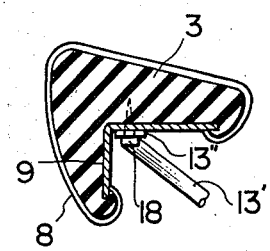
FIG. 8 is a schematic sectional view of a modified embodiment illustrating the front cushion and the support frame attached thereto.
Figure 9:
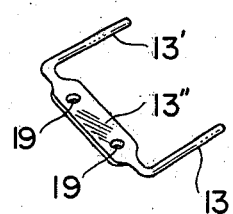
FIG. 9 is a perspective view of a support frame shown in FIG. 8.

Referring to FIGS. 7, 8, and 9, there are shown two different embodiments of the way of connecting the support bracket 9 of the front pad 3 with the support frame 13. As shown in FIG. 7, the cross-section of FIG. 6 taken on line VII—VII, the support frame 13, 13' is fastened to the support bracket 9 with screws 18 through the bolt holes of two angled attaching lugs 17 and 17, which are fastened, for example by welding, to the middle of the U-shaped support frame 13, 13'. The inclination of the support frame 13, 13' depends upon the inclination of the attaching lugs 17 and 17. FIGS. 8 and 9 show another embodiment in which a modified support frame 13, 13' is used, having in the middle thereof an angled plate part 13" with two bolt holes therein.

FIG. 10 shows another embodiment in which the U-shaped support frame 13, 13' is so fastened in the middle to the corner of the support bracket 9 of the front pad with a hinge 20 that the front pad 3 can rotate. A restoring tension spring 21 is extended between the support bracket 9 of the front pad 3 and the cushion frame 1 to keep the normal position shown by the solid line in FIG. 11. Rotatably fastening the front pad 3 to the support frame 13, 13' takes care of the situation in which a seated man has little inclination of his thigh. It is, therefore, useful for the seat of vehicles such as sports cars.

Referring to FIG. 12, there is shown a embodiment of the structure of said cross-adjusting unit which moves said front pad 3 forward and backward steplessly. The support frame 13 passes slidably through a cylindrical housing 121 and bushings 120 and 122 which are fixed to both the ends of the housing 121 respectively. The support frame 13 also passes through a helical torsion spring 123 and has a right end 123a, which is bent axially. The right end 123a is fixed into a bushing notch 122a, and the left end 123b is fixed into a twisting notch 124 which is located at the right edge of the cylinder, with the knob 12a surrounding the support frame 13. The inside diameter of the helical torsion spring 123 is slightly smaller than the outside diameter of the support frame 13. The diametrical difference forces the inside diameter of the coil to enlarge, producing strain therein. The helical torsion spring 123 is fixed by both the bushings 120 and 122 and in the housing 121 wraps the support frame 13 tightly with a force in proportion to its distortion, the support frame being fixed to the cross-adjusting unit 12. As a result, the front pad 3, which is fastened to the support frame 13, is also fixed. On the other hand, when the knob 12a is turned in a counter-clockwise direction or in a releasing direction, the helical torsion spring 123 is twisted in an unwinding direction, and opens with the inside diameter thereof enlarged in proportion to the torsion, until the support frame 13 is allowed to slide. In this case, the front pad 3 not only can be automatically pushed forward by the resiliency of the spring 14, but also can be pulled back against the resiliency thereof. In this way the front pad 3 can be adjusted to the desired position steplessly. The helical torsion spring 123 and the knob 12a are both placed in a cylinder spacer 125, with a C-shaped cross section, having an axial split groove and being fixed between the bushings 120 and 122. Consequently, when opening, the helical torsion spring 123 does not enlarge in excess of the inside diameter of the cylinder spacer 125.

When a support frame 13, 13' and support bracket 9 of sufficient strength and rigidity are employed, two cross-adjusting units, as shown in FIG. 6, are not required for adjusting the position of the front pad 3. One unit, for example the one indicated at 12' in FIG. 6, can be replaced by a cylindrical guide member slidably supporting the support frame 13'. This replacement results in the reduction of the cost and the complexity of the assembly. FIG. 13 shows still another embodiment of this invention in which a side framework 23 united with both the rear pad 2 and the cushion frame 1 covers the sides of the front pad 3 as a screen for an opening 22 created by the separation of the front pad 3 from the rear pad 2. A spring 24 is stretched between right and left projections 9a and 9a of the support bracket 9 to support the front pad 3.

Referring to FIGS. 14 and 15, there is shown another embodiment, in which a finisher of almost the same height as the seat is placed vertically along one side of the seat as a screen covering the opening 22 between the front pad 3 and the rear pad 2. From FIG. 15, it is seen that the cross-adjusting unit 12, even if placed outside the frame 1, is covered by the finisher 25.

As seen from the embodiment mentioned above, in accordance with the present invention the front pad is able to be shifted steplessly and independent of the rear pad so as to be adjusted to the most comfortable position with the inclination determined by the cross-adjusting unit. This provides seated men of various sizes, postures, and preferences with sufficient space and secure support to the thigh even when the front pad is extended. They can even adjust the position of the front pad while seated.

What is claimed is:

1. A vehicle seat having a bottom cushion portion comprising a rear pad and an independently moving front pad, a bottom cushion frame having means for resiliently mounting said rear pad thereon, and a front pad adjusting means associated with said bottom cushion frame for adjustably moving said front pad along a straight path away from and back towards said rear pad, said front pad straight movement path forming an angle with the horizontal, said front pad moving forwardly and upwardly, and moving rearwardly and downwardly, relative to said rear pad, said front pad adjusting means including spring means continuously urging said front pad away from said rear pad, and operating handle means for permitting controlled inclined straight movement of said front pad.

2. The vehicle seat of claim 1 wherein said front pad adjusting means moves said front pad in an infinitely adjustable stepless smooth manner.

3. The vehicle seat of claim 1 wherein said front pad movement path angle approximates the angle of the underside of the thigh of an average size seated vehicle driver.

4. The vehicle seat of claim 3 wherein said front pad straight movement path angle is between 22 and 42 degrees relative to the horizontal.

5. The vehicle seat of claim 1 wherein said front pad adjusting means includes a hollow cylinder, a support frame rod element extending through said cylinder, bushings fixed at each end of said cylinder, an operating handle transversely fixed to said support frame rod element and extending through a slot formed in the wall of said cylinder, said cylinder slot being substantially perpendicular to the cylinder axis, and a helical spring mounted about said support frame rod element, one of the ends of said spring being fixed to said rear bushing, the other of the ends of said spring being fixed to said operating handle, said operating handle rotating in one direction to tighten said helical spring to lock said rod element in said cylinder to maintain said front pad in a stationary position, said operating handle rotating in the other direction to loosen said helical spring to unlock said rod element in said cylinder to permit said front pad to move up and away from said rear pad under the urging of said helical spring, and to permit said front pad to move down and towards said rear pad against the force of said helical spring.

* * * * *